United States Patent
Gatley et al.

(10) Patent No.: US 9,372,530 B2
(45) Date of Patent: *Jun. 21, 2016

(54) ASPECT-RATIO INDEPENDENT, MULTIMEDIA CAPTURE AND EDITING SYSTEMS AND METHODS THEREOF

(75) Inventors: Ian Gatley, Fairport, NY (US); Mitchell Rosen, Rochester, NY (US); James Meyer, Fairport, NY (US); Robert A. Clark, Peaks Island, ME (US); Jonathan Schull, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 2344 days.

This patent is subject to a terminal disclaimer.

(21) Appl. No.: 11/965,409

(22) Filed: Dec. 27, 2007

(65) Prior Publication Data
US 2009/0091511 A1 Apr. 9, 2009

Related U.S. Application Data

(63) Continuation of application No. 11/867,395, filed on Oct. 4, 2007.

(51) Int. Cl.
*G09G 5/00* (2006.01)
*G06F 3/00* (2006.01)
(52) U.S. Cl.
CPC ........................................ *G06F 3/002* (2013.01)
(58) Field of Classification Search
CPC ....................................................... G06F 3/002
USPC ......... 345/1.1, 1.2, 1.3, 7–9, 32, 204; 434/44, 434/38, 29, 30, 55, 308, 365; 348/121.84
See application file for complete search history.

(56) References Cited

U.S. PATENT DOCUMENTS

| | | | |
|---|---|---|---|
| 5,023,725 A | 6/1991 | McCutchen | |
| 5,179,440 A | 1/1993 | Loban et al. | |
| 5,576,725 A | 11/1996 | Shimada | |
| 5,745,126 A | 4/1998 | Jain et al. | |
| 5,850,352 A * | 12/1998 | Moezzi et al. | 345/419 |
| 6,002,430 A | 12/1999 | McCall | |
| 6,190,172 B1 | 2/2001 | Lechner | |
| 6,456,339 B1 * | 9/2002 | Surati et al. | 348/745 |
| 6,690,374 B2 | 2/2004 | Park et al. | |
| 6,940,528 B2 | 9/2005 | Fukui et al. | |

(Continued)

OTHER PUBLICATIONS

Treskunov, A., Pair, J. Projector-Camera Systems for Immersive Training. 25th Army Science Conference (Orlando, FL, Nov. 2006).

(Continued)

*Primary Examiner* — Jennifer Nguyen
(74) *Attorney, Agent, or Firm* — Joseph M. Noto; Bond, Schoeneck & King PLLC

(57) ABSTRACT

A multimedia capture system includes a plurality of imaging systems and one or more detection systems. The plurality of imaging systems capture image areas of a scene from at least partially different locations. The one or more detection systems determine a relative position of each of the plurality of imaging systems with respect to the different locations of the scene from where the image areas are captured. The relative position of each of the plurality of imaging systems and the captured image areas are used to generate a multimedia presentation of the scene. The capture system may be worn by an individual or may be on a stationary or mobile support.

14 Claims, 3 Drawing Sheets

(56) References Cited

U.S. PATENT DOCUMENTS

| | | | |
|---|---|---|---|
| 7,030,835 B2 * | 4/2006 | Krempl | 345/1.1 |
| 7,176,883 B2 * | 2/2007 | Yoneno | G06F 3/0425 345/156 |
| 7,224,282 B2 | 5/2007 | Terauchi et al. | |
| 2003/0025791 A1 | 2/2003 | Kaylor et al. | |
| 2005/0104971 A1 | 5/2005 | Pilu | |
| 2005/0131924 A1 | 6/2005 | Jones | |
| 2005/0185711 A1 | 8/2005 | Pfister et al. | |
| 2005/0231085 A1 | 10/2005 | Song et al. | |
| 2007/0188719 A1 | 8/2007 | Jaynes et al. | |
| 2008/0111763 A1 * | 5/2008 | Gatley et al. | 345/1.1 |
| 2009/0091510 A1 * | 4/2009 | Gatley et al. | 345/1.1 |

OTHER PUBLICATIONS

Bax, "Real-Time Lens Distortion Correction: 3D Video Graphics Cards Are Good for More Than Games," Stanford ECJ, 9-13 (2004).

* cited by examiner

ASPECT-RATIO INDEPENDENT, MULTIMEDIA CAPTURE AND EDITING SYSTEMS AND METHODS THEREOF

This is a continuation application of U.S. patent application Ser. No. 11/867,395, filed on Oct. 4, 2007.

FIELD OF THE INVENTION

This invention generally relates to display systems and, more particularly, to aspect-ratio independent, multimedia capture, editing, and/or presentation systems and methods thereof.

BACKGROUND

There is a growing demand for large area, high resolution displays for a variety of different applications, including educational, scientific, and entertainment, in a variety of different settings, including classrooms, work settings, entertainment venues and home settings. Unfortunately, existing presentation systems are limited to a static rectangular layout or some simple perturbation from that with contiguous pixels. As a result, there is a practical limit to the shape and character of these displays.

To overcome this limit, one technique has been to tile together the outputs from multiple projectors. The projectors are spaced apart and output images to different portions of a display area. One example of such a system is a planetariums where multiple projectors output a display on to a dome-shaped screen for educational and entertainment purposes.

Although this type of technique helps to increase the overall area of these displays, the resulting image quality is modest at best. Additionally, the content is limited to the particular size and shape of the planetarium or other display system the content was specifically designed for display on. The technique can not accurately capture and then reproduce wide area content with multiple imaging systems on a variety of different display environments.

SUMMARY

A multimedia capture system in accordance with other embodiments of the present invention includes a plurality of imaging systems and one or more detection systems. The plurality of imaging systems capture image areas of a scene from at least partially different locations. The one or more detection systems determine a relative position of each of the plurality of imaging systems with respect to the different locations of the scene from where the image areas are captured. The relative position of each of the plurality of imaging systems and the captured image areas are used to generate a multimedia presentation of the scene. The capture system may be worn by an individual or may be on a stationary or mobile support.

A method for capturing a scene to generate a presentation in accordance with other embodiments of the present invention includes capturing image areas of a scene from at least partially different locations with a plurality of imaging systems. A relative position of each of the plurality of imaging systems with respect to the different locations of the scene from where the image areas are captured is determined. The relative position of each of the plurality of imaging systems and the captured image areas is used to generate a multimedia presentation of the scene.

The present invention provides a number of advantages including providing a multimedia capture, editing, and/or presentation system that can capture, edit, and/or present information using wearable, mobile or adjustable components that can move within and automatically react to any environment. Editing tools cover three functions: one for laying-out complex multimedia wide-view shows; a second for capturing the physical layout of multi-display environments; and a third for linking the shows to the display environments by pre-distorting the content and placing it appropriately onto the physical or virtual displays. The same show can be easily relinked to a new display configuration without any need for extensive user-driven layout revision. The present invention is able to dynamically adjust the output of the wide-area, multimedia content as the display environment changes and/or the subject moves. Further, with the present invention there is no imposed aspect-ratio and the captured content can be accurately displayed on a variety of different types of display settings and configurations, such desktops, floors, arbitrary wall spaces, and even people as part of the display.

DETAILED DESCRIPTION

Figure 1:
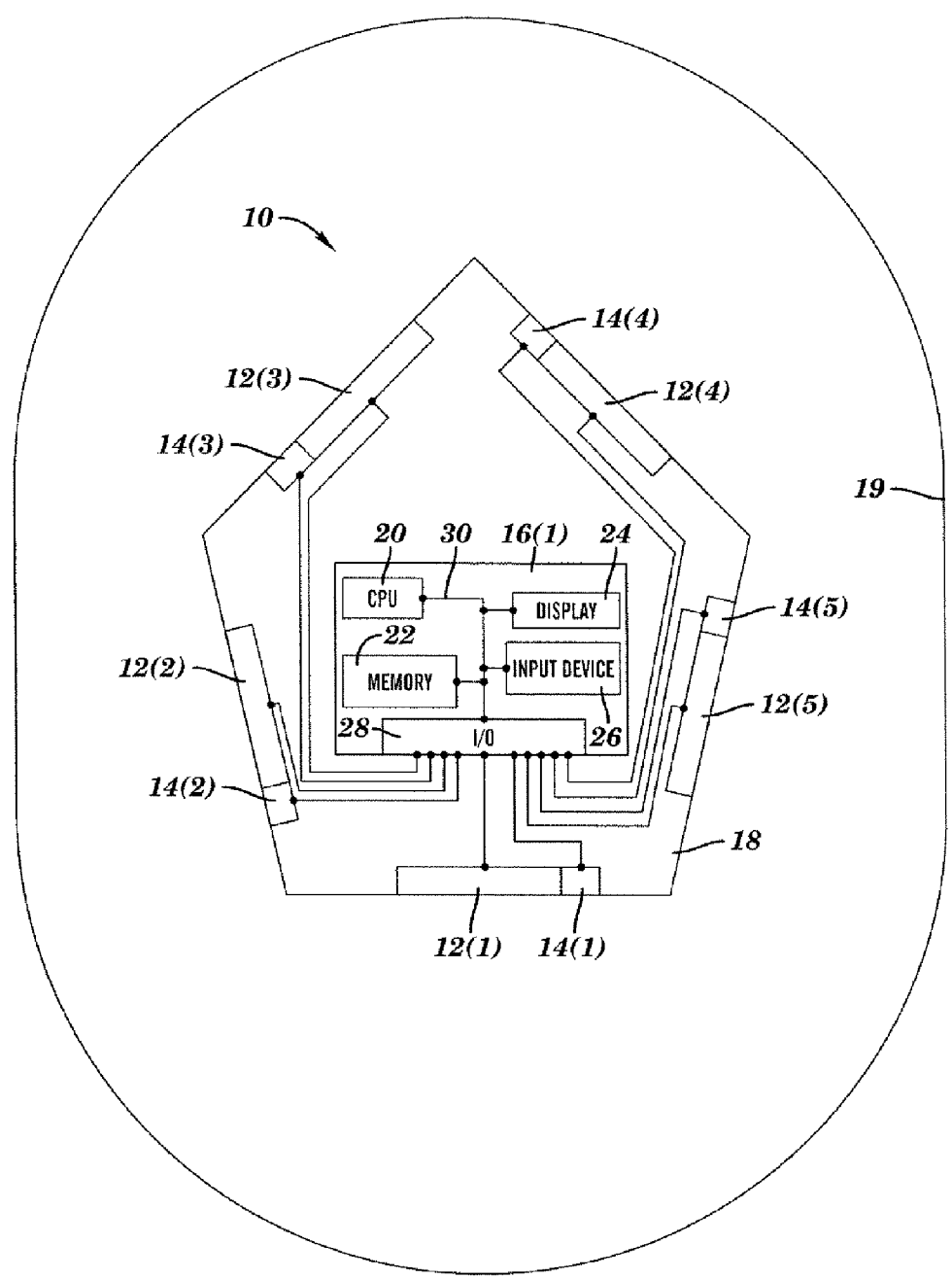
FIG. 1 is a diagram of a multimedia capture and editing system in accordance with embodiments of the present invention.

A multimedia capture and editing system 10 in accordance with embodiments of the present invention is illustrated in FIG. 1. The multimedia capture and editing system 10 includes imaging systems 12(1)-12(5), detection systems 14(1)-14(5), a control system 16(1), a support system 18, although the multimedia capture and editing system 10 can include other numbers and types of systems, devices, and elements in other configurations. The present invention provides a number of advantages including providing a multimedia capture, editing, and/or presentation system that can capture, edit, and/or present information from multiple angles of a scene simultaneously in a very wide view giving an audience a realistic and immersive experience.

Referring more specifically to FIG. 1, the multimedia capture and editing system 10 in accordance with embodiments of the present invention is illustrated. In the multimedia capture and editing system 10, each of the imaging systems 12(1)-12(5) is a video imaging system which is used to capture two-dimensional video, although other types and numbers of imaging systems which can capture other types of content can be used. The imaging systems 12(1)-12(5) are each positioned to capture a different portion of at least about seventy-two degrees of a scene 19 to capture a three-hundred-sixty degree view, although the imaging systems can be positioned to capture other portions of the scene 19. By, way of example only, the imaging systems 12(1)-12(5) could be positioned to capture overlapping portions of the scene 19 or to capture portions which provide at least a ninety degree view of the scene 19. A variety of different types of two-dimensional and three-dimensional scenes can be captured, such as a crowd scene in a stadium at a sporting event by way of example only. The imaging systems 12(1)-12(5) are coupled to the multimedia control system 16(1) which controls the operations of and stores content captured by the imaging system 12(1)-12(5), although the imaging systems 12(1)-12(5) could be coupled to and controlled by other types and numbers of control systems and the content can be stored in other locations. The imaging systems 12(1)-12(5) can be static in their setup or may be repositioned relative to the scene or each other either manually or automatically by multimedia control system 16(1). Additionally, the imaging systems 12(1)-12(5) may be zoomed and refocused either manually or automatically multimedia control system 16(1).

The detection systems 14(1)-14(5) are located adjacent to the imaging systems 12(1)-12(5) and are used to determine the orientation of and the distance from the scene 19 of each of the imaging systems 12(1)-12(5), although other types and numbers of detection systems which determine other types and amounts of relative positioning data can be used, such as a single detection system. The detection systems 14(1)-14(5) are coupled to the multimedia control system 16(1) which controls the operations of and stores data from the detection systems 14(1)-14(5) which corresponds with the content being captured by each of the imaging systems 12(1)-12(5), although the detection systems 14(1)-14(5) could be coupled to and controlled by other types and numbers of control systems and the data can be stored in other locations.

The multimedia control system 16(1) controls the operation of the imaging systems 12(1)-12(5) and the detection systems 14(1)-14(5), although other types and numbers of control systems to control other types and numbers of systems and to store other types of data could be used. Additionally, the multimedia control system 16(1) generates a multimedia presentation based on the captured image areas and the determined relative position of each of the plurality of imaging systems with respect to the different locations of the scene 19 from where the image areas are captured. The generation of the multimedia presentation by the multimedia control system 16(1) may also be based on combining other obtained multimedia content, such as content obtained from memory 22, with the captured image areas. Further, the multimedia control system 16(1) accounts and corrects for any overlap with the captured image areas when generating the multimedia presentation to provide a smooth and substantially seamless output. The multimedia control system 16(1) is connected to the support system 18, although the multimedia control system 16(1) could be at other locations remote from the imaging systems 12(1)-12(5) and the detection systems 14(1)-14(5). The multimedia control system 16(1) includes a central processing unit (CPU) or processor 20, a memory 22, a display 24, a user input device 26, and an interface system 28, and which are coupled together by a bus or other link 30, although the control system 16(1) can include other numbers and types of components, parts, devices, systems, and elements in other configurations.

The processor 20 of the multimedia control system 16(1) executes a program of stored instructions for one or more aspects of the present invention as described and illustrated herein, although the processor 20 could execute other numbers and types of programmed instructions. The memory 22 in the control system 16(1) stores these programmed instructions, data, and other content for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the control system 16(1).

The display 24 in the multimedia control system 16(1) is used to show data and information to the user, such as relative positioning data or captured image areas or other content by way of example only. The display 24 can include a computer display screen, such as a CRT or LCD screen, although other types and numbers of displays could be used. The user input device 26 in the multimedia control system 16(1) is used to input selections, such as requests for capturing or editing content, although the user input device could be used to input other types of data and interact with other elements. The user input device 26 can include a computer keyboard and a computer mouse, although other types and numbers of user input devices can be used.

The interface system 28 in the multimedia control system 16(1) is used to operatively couple to and communicate over a communication network with the imaging system 12(1)-12(5) and the detection systems 14(1)-14(5), although other types and numbers of interface systems and communication networks or systems with other types and numbers of connections and configurations can be used. By way of example only, the communication network or system can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols.

The support system 18 is a stationary structure on which the imaging system 12(1)-12(5) are mounted for capturing content for the multimedia presentation, the detection systems 14(1)-14(5) are mounted for determining the relative positioning of each of the imaging systems 12(1)-12(5), and for supporting the multimedia control system, although other types and numbers of support systems for supporting other system, devices, and elements could be used. By way of example only, the support system 18 could be a hat or other wearable gear or could be a self-propelled or other motorized device which can move while capturing a scene.

Figure 2:
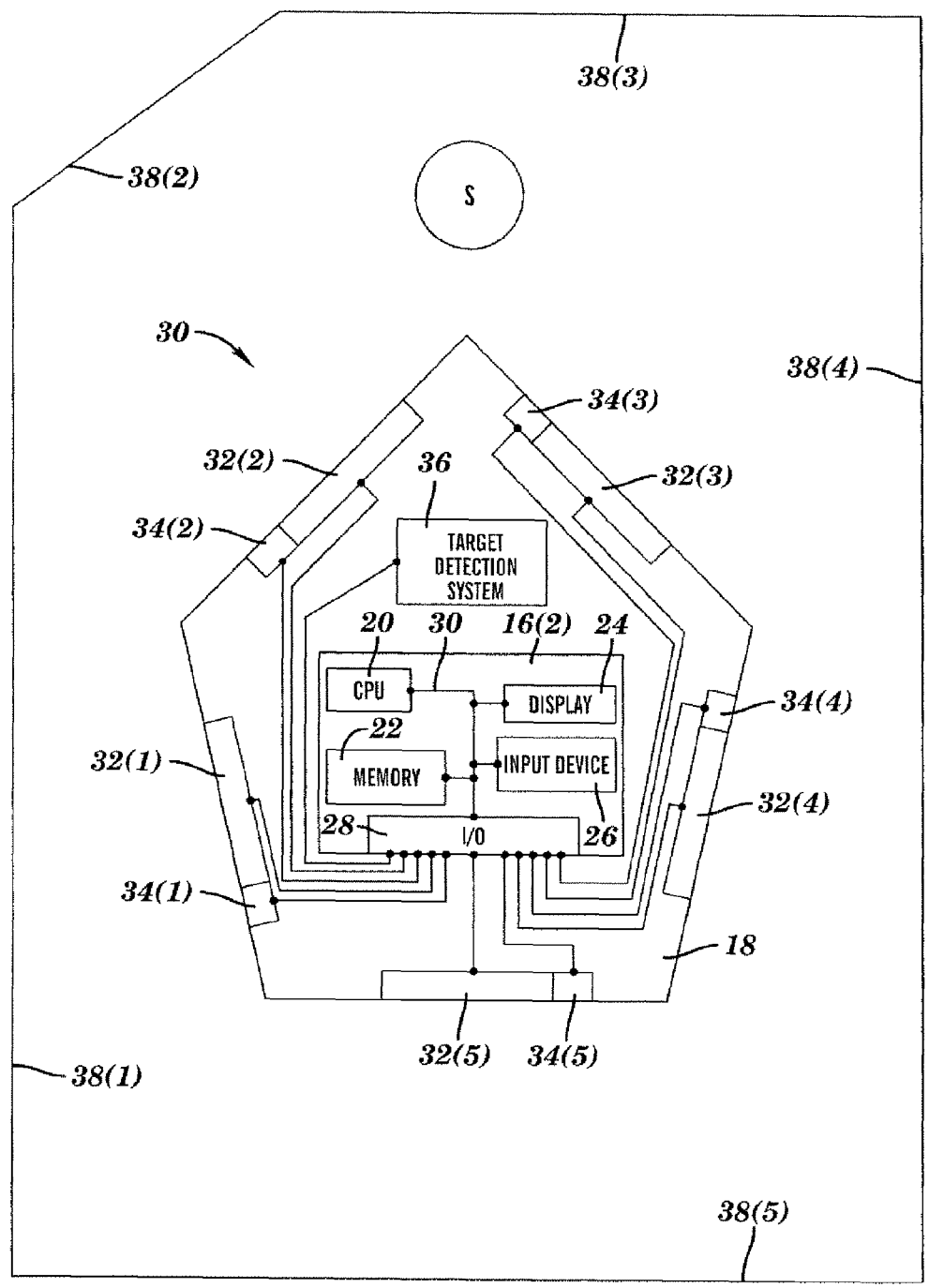
FIG. 2 is a diagram of a multimedia capture and presentation system in accordance with other embodiments of the present invention.

Referring to FIG. 2, a multimedia capture and presentation system 30 in accordance with embodiments of the present invention is illustrated. The multimedia capture and presentation system 30 is the same as the multimedia capture and editing system 10 in structure and operation, except as described and illustrated herein. Elements in multimedia capture and presentation system 30 which are like those in multimedia capture and editing system 10 will have like reference numerals and will not be described again in detail here. The multimedia capture and presentation system 30 includes imaging systems 32(1)-32(5), detection systems 34(1)-34(5), target detection system 36, a control system 16(2), and a support system 18, although the multimedia capture and presentation system 30 can include other numbers and types of systems, devices, and elements in other configurations.

Each of the imaging systems 32(1)-32(5) is a video imaging system which is used to capture and output two-dimensional video, although other types and numbers of imaging systems which can capture and output for display other types of content can be used such as separate or combined systems that can capture and output content. The imaging systems 32(1)-32(5) are each positioned to capture for display a different portion of a three-hundred-sixty degree view of scene along with relative positioning data in the manner illustrated and described with reference to FIG. 1. Again, a variety of different amounts and types of two-dimensional and three-dimensional image areas can be captured. The imaging systems 32(1)-32(5) also are able to output the captured content for display on the walls 38(1)-38(5) of the display environment, although the imaging systems can be positioned to output for display other portions of the view of the scene. By way of example only, the imaging systems 32(1)-32(5) could be positioned to capture and output for display at least a ninety degree view of the scene. The imaging systems 32(1)-32(5) are coupled to the multimedia control system 16(2) which controls the operations of imaging systems 32(1)-32(5) to capture image areas of a scene and output content for a multimedia presentation, although the imaging systems 32(1)-32(5) could be coupled to and controlled by other types and numbers of control systems and the content can be stored in other locations. The imaging systems 32(1)-32(5) can be static in their setup or may be repositioned relative to the scene, the display environment, or each other either manually or automatically by multimedia control system 16(2). Additionally, the imaging systems 32(1)-32(5) may be zoomed and refocused either manually or automatically multimedia control system 16(2). The imaging systems 32(1)-32(5) may also comprise separate systems for capturing content and for displaying the multimedia presentation.

The detection systems 34(1)-34(5) are located adjacent to the imaging systems 32(1)-32(5) and are used to determine the orientation of and the distance from the scene of each of the imaging systems 32(1)-32(5) and are used to determine the orientation of and the distance from the display environment 38(1)-38(5) of each of the imaging systems 32(1)-32(5), although other types and numbers of detection systems which determine other types and amounts of relative positioning data for capture and presentation can be used, such as a single detection system. The detection systems 34(1)-34(5) are coupled to the multimedia control system 16(2) which controls the operations of and stores data from the detection systems 34(1)-34(5) which corresponds with the content being captured and output for display by each of the imaging systems 32(1)-32(5), although the detection systems 34(1)-34(5) could be coupled to and controlled by other types and numbers of control systems and the data can be stored in other locations.

The target detection system 36 is used to determine the relative distance and location of a subject S with respect to the imaging systems 32(1)-32(5) and the display environment 38(1)-38(5), although other types and numbers of detection systems for monitoring other subjects could be used. In this particular embodiment, the subject is an animate subject and may be moving with respect to the display environment 38(1)-38(5) requiring an adjustment of the display of the multimedia presentation, although other types and numbers of subjects could be monitored. The target detection system 36 is coupled to the multimedia control system 16(2) which controls the operations of and stores data from the target detection system 36 which corresponds to the relative distance and location of a subject S with respect to the imaging systems 32(1)-32(5), although the target detection system 36 could be coupled to and controlled by other types and numbers of control systems and the data can be stored in other locations.

The multimedia control system 16(2) controls the operation of the imaging systems 32(1)-32(5), the detection systems 34(1)-34(5), and the detection system 36, although other types and numbers of control systems to control other types and numbers of systems and to store other types of data could be used. Additionally, the multimedia control system 16(2) can dynamically generate and adjust a multimedia presentation based on the determined relative position of each of the plurality of imaging systems 32(1)-32(5) with respect to the different locations of the scene from where the image areas are captured and the determined relative position of each of the plurality of imaging systems 32(1)-32(5) with respect to the walls 38(1)-38(5) of the display environment on which the multimedia presentation is displayed. Further, the multimedia control system 16(2) dynamically can generate and adjust the multimedia presentation based on the determined relative position of the subject S. Even further, the generation of the multimedia presentation by the multimedia control system 16(2) may be based on combining other obtained multimedia content, such as content obtained from memory 22, with the captured image areas. The multimedia control system 16(2) also accounts and corrects for any overlap with the captured image areas when generating the multimedia presentation to provide a smooth and substantially seamless output. The multimedia control system 16(2) is connected to the support system 18, although the multimedia control system 16(2) could be in other locations, such as at a remote location from the imaging systems 32(1)-32(5), the detection systems 34(1)-34(5), and the detection system 36. The multimedia control system 16(2) includes a central processing unit (CPU) or processor 20, a memory 22, a display 24, a user input device 26, and an interface system 28, and which are coupled together by a bus or other link 30, although the control system 16(2) can include other numbers and types of components, parts, devices, systems, and elements in other configurations.

The processor 20 of the multimedia control system 16(2) executes a program of stored instructions for one or more aspects of the present invention as described and illustrated herein, although the processor 20 could execute other numbers and types of programmed instructions. The memory 22 in the control system 16(2) stores these programmed instructions, data, and other content for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the control system 16(2).

The display 24 in the multimedia control system 16(2) is used to show data and information to the user, such as relative positioning data or captured content by way of example only. The display 24 can include a computer display screen, such as a CRT or LCD screen, although other types and numbers of displays could be used. The user input device 26 in the multimedia control system 16(2) is used to input selections, such as requests for capturing and/or presenting content, although the user input device could be used to input other types of data and interact with other elements. The user input device 26 can include a computer keyboard and a computer mouse, although other types and numbers of user input devices can be used.

The interface system 28 in the multimedia control system 16(2) is used to operatively couple to and communicate over a communication network with the imaging system 32(1)-32(5), the detection systems 34(1)-34(5), and the target detection system 30, although other types and numbers of interface systems and other types and numbers of communication networks or systems with other types and numbers of connections and configurations can be used. By way of example only, the communication network or system can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols.

The display environment comprises a series of interconnected walls 38(1)-38(5) of a room which have a plurality of disposable display panels with a non-permanent adhesive on one surface secured to the walls 38(1)-38(5) in a two-dimensional pattern, although the display environment can comprise other numbers and types of walls in other configurations and with other number and types of display elements which are attached in other manners. By way of example only, one or more walls 38(1)-38(5) of the display environment could be coated with a layer of self-luminant material, although other numbers of layers and other types of materials could be used. Additionally, the display panels could be arranged in other configurations, such as in a three-dimensional configuration, in a contiguous pattern, in a non-contiguous pattern, and in other user configurable pattern. The detection systems 34(1)-34(5) can identify the location and type of display elements and the multimedia control system 16(2) can adjust the output from the imaging systems 32(1)-32(5) based on the identified location and type of display elements. By way of example only, assuming the captured scene corresponded to the scene 19 shown in FIG. 1 and the display environment comprised the five walls 38(1)-38(5) shown in FIG. 2, the multimedia control system 16(2) would adjust the captured image areas of the scene 19 from each of the imaging systems 32(1)-32(5) to conform to the five walls 38(1)-38(5) of the display environment based on the relative positioning data obtained during the capture and presentation of the image areas.

Figure 3:
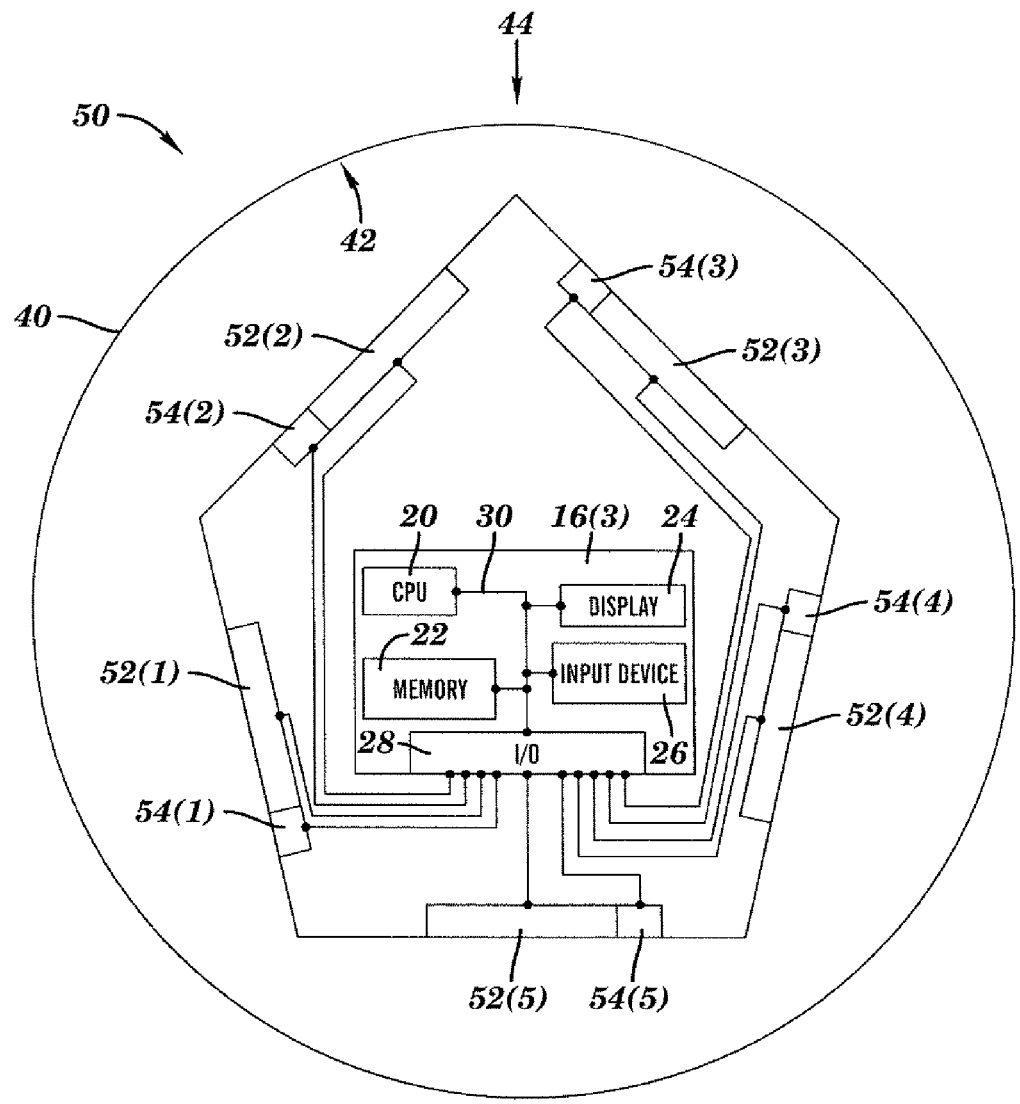
FIG. 3 is a diagram of a multimedia presentation system in accordance with other embodiments of the present invention.

Referring to FIG. 3, a multimedia presentation system 50 in accordance with embodiments of the present invention is illustrated. The multimedia presentation system 50 is the same as the multimedia capture and presentation system 30 in structure and operation, except as described and illustrated herein. Elements in multimedia presentation system 50 which are like those in multimedia capture and presentation system 30 will have like reference numerals and will not be described again in detail here.

The multimedia presentation system 50 includes imaging systems 52(1)-52(5), detection systems 54(1)-54(5), a translucent three-dimensional display structure 40, a control system 16(3), and a support system 18, although the multimedia presentation system 50 can include other numbers and types of systems, devices, and elements in other configurations.

Each of the imaging systems 52(1)-52(5) is a video projection system which is used to output for display a three-dimensional video of a captured scene on to an inner surface 42 of display structure 40 for viewing on outer surface 44 of display structure 40, although other types and numbers of imaging systems which can obtain and output for display other types of content can be used. By way of example only, the imaging systems 52(1)-52(5) could output for display video of a three-dimensional scene on to an inner surface 42 of display structure 40 for viewing on the inner surface of display structure 40 if the display structure were opaque, such as in a planetarium setting. In another example, the imaging systems 52(1)-52(5) along with the detection systems 54(1)-54(5) and the multimedia control system 16(3) could be positioned outside of and around the outer perimeter of the projection structure 40 to output for display video of a three-dimensional scene on to the outer surface 44 of display structure 40 for viewing on the inner surface 42 of the display structure 40. The imaging systems 52(1)-52(5) are coupled to the multimedia control system 16(3) which controls the operations of imaging systems 32(1)-32(5), although the imaging systems 52(1)-52(5) could be coupled to and controlled by other types and numbers of control systems and the content can be stored in other locations. The imaging systems 52(1)-52(5) can be static in their setup or may be repositioned relative to the projection structure 40 or each other either manually or automatically by multimedia control system 16(3). Additionally, the imaging systems 52(1)-52(5) may be zoomed and refocused either manually or automatically multimedia control system 16(3).

The detection systems 54(1)-54(5) are located adjacent to the imaging systems 52(1)-52(5) and are used to determine the orientation of and the distance from the projection structure 40 of each of the imaging systems 52(1)-52(5), although other types and numbers of detection systems which determine other types and amounts of relative positioning data for presentation can be used, such as a single detection system, or the relative positioning data can be predetermined and stored so that no detection system is needed. The detection systems 54(1)-54(5) are coupled to the multimedia control system 16(3) which controls the operations of and stores data from the detection systems 54(1)-54(5), although the detection systems 54(1)-54(5) could be coupled to and controlled by other types and numbers of control systems and the data can be stored in other locations.

The multimedia control system 16(3) controls the operation of the imaging systems 52(1)-52(5) and the detection systems 54(1)-54(5), although other types and numbers of control systems to control other types and numbers of systems could be used. The multimedia control system 16(3) can dynamically generate and adjust a multimedia presentation based on the determined relative position of each of the plurality of imaging systems 52(1)-52(5) with respect to the projection structure 40 on which the image areas are displayed. The multimedia control system 16(3) also accounts and corrects for any overlap with the output image areas when generating the multimedia presentation to provide a smooth and substantially seamless output. The multimedia control system 16(3) is connected to the support system 18, although the multimedia control system 16(3) could be in other locations, such as at a remote location from the imaging systems 52(1)-52(5) and the detection systems 54(1)-54(5). The multimedia control system 16(3) includes a central processing unit (CPU) or processor 20, a memory 22, a display 24, a user input device 26, and an interface system 28, and which are coupled together by a bus or other link 30, although the control system 16(3) can include other numbers and types of components, parts, devices, systems, and elements in other configurations.

The processor 20 of the multimedia control system 16(3) executes a program of stored instructions for one or more aspects of the present invention as described and illustrated herein, although the processor 20 could execute other numbers and types of programmed instructions. The memory 22 in the control system 16(3) stores these programmed instructions, data, and other content for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the control system 16(3).

The display 24 in the multimedia control system 16(3) is used to show data and information to the user, such as relative positioning data or content to be displayed by way of example only. The display 24 can include a computer display screen, such as a CRT or LCD screen, although other types and numbers of displays could be used. The user input device 26 in the multimedia control system 16(3) is used to input selections, such as requests for presenting content, although the user input device could be used to input other types of data and interact with other elements. The user input device 26 can include a computer keyboard and a computer mouse, although other types and numbers of user input devices can be used.

The interface system 28 in the multimedia control system 16(3) is used to operatively couple to and communicate over a communication network with the imaging system 52(1)-52(5) and the detection systems 54(1)-54(5), although other types and numbers of interface systems and other types and numbers of communication networks or systems with other types and numbers of connections and configurations can be used. By way of example only, the communication network or system can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols.

The display structure 40 is made of a translucent material, although the display structure 40 could be made of other materials, such as a partially translucent material or an opaque material. Additionally, the display structure 40 is sphere shaped, although the display structure 40 could have other types of shapes, such as a partial sphere shape or a hexagon shape.

Although embodiments of the multimedia control systems are described and illustrated herein, the multimedia control systems can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, the embodiments of the multimedia control systems may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the multimedia control systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The operation of the multimedia capture and editing system 10 in accordance with embodiments of the present invention will now be described with reference to FIG. 1. The multimedia capture and editing system 10 is positioned at the scene 19 to be captured. The support system 18 for the plurality of imaging systems 12(1)-12(5) and detection systems 14(1)-14(5) is stationary with respect to the scene, although the support system 18 could be mobile. For example, the support system 18 could be a hat or other wearable gear on a subject that could be stationary or moving during the capture of the image areas. Additionally, the support system 18 could be a self-propelled or otherwise motorized system which is controlled to move by a user or automatically by the multimedia control system 16(1).

While the multimedia capture and editing system 10 is being set for its initial position for image capture, one or more of the imaging controls, such as for zoom and focus, on as well as the positioning of the imaging systems 12(1)-12(5) can be adjusted. This adjustment can be manual by the user or automatically by the multimedia control system 16(1).

Once the imaging controls and positioning is set, the imaging systems 12(1)-12(5) begin to capture image areas which comprise portions of the scene. In this example, the imaging systems 12(1)-12(5) each capture sequential portions of about seventy-two degrees of the scene 19 to capture a three-hundred-and-sixty degree view of the scene, although other portions of the scene can be captured, such as at least ninety degrees. Meanwhile, the detection systems 14(1)-14(5) determine an orientation and distance from the scene of each of the imaging systems 12(1)-12(5) which is stored in memory 22 in a manner which corresponds with the captured image areas, although other types of relative positioning data could be determined and stored.

Next, the multimedia control system 16(1) can generate a multimedia presentation based on the captured image areas and the determined relative position of each of the plurality of imaging systems with respect to the different locations of the scene 19 from where the image areas are captured. As part of this generation of the multimedia presentation, the multimedia control system 16(1) accounts and corrects for any overlap with the captured image areas to generate a smooth and substantially seamless multimedia presentation. The multimedia control system 16(1) may also obtain and combine other multimedia content to generate the multimedia presentation, although other numbers and types of functions can be performed on the multimedia presentation.

The operation of the multimedia capture and presentation system 30 in accordance with embodiments of the present invention will now be described with reference to FIG. 2. The multimedia capture and presentation system 30 is positioned at a scene to be captured. Again, the support system 18 for the plurality of imaging systems 32(1)-32(5) and detection systems 34(1)-34(5) is stationary with respect to the scene, although the support system 18 could be mobile. For example, the support system 18 could be a hat or other wearable gear on a subject that could be stationary or moving during the capture of the image areas. Additionally, the support system 18 could be a self-propelled or otherwise motorized system which is controlled to move by a user or automatically by the multimedia control system 16(2).

While the multimedia capture and presentation system 30 is being set for its initial position for image capture, one or more of the imaging controls, such as for zoom and focus, on as well as the positioning of the imaging systems 32(1)-32(5) can be adjusted. This adjustment can be manual by the user or automatically by the multimedia control system 16(2).

Once the imaging controls and positioning is set, the imaging systems 32(1)-32(5) begin to capture image areas which comprise portions of the scene. In this example, the imaging systems 32(1)-32(5) each capture sequential portions of about seventy-two degrees of the scene to capture a three-hundred-and-sixty degree view of the scene, although other portions of the scene can be captured, such as at least a ninety degree view. Meanwhile, the detection systems 34(1)-34(5) determine an orientation and distance from the scene of each of the imaging systems 12(1)-12(5) which is stored in memory 22 in a manner which corresponds with the captured image areas, although other types of relative positioning data could be determined and stored.

Next, the detection systems 34(1)-34(5) determine an orientation and distance from each of the imaging systems 32(1)-32(5) to the walls 38(1)-38(5) of the display environment on which this multimedia presentation will be displayed. Next, the multimedia control system 16(2) generates a multimedia presentation based on the determined relative position of each of the plurality of imaging systems 32(1)-32(5) with respect to the different locations of the scene from where the image areas are captured and the determined relative position of each of the plurality of imaging systems 32(1)-32(5) with respect to the walls 38(1)-38(5) of the display environment on which the image areas are displayed. As part of this generation of the multimedia presentation, the multimedia control system 16(2) accounts and corrects for any overlap with the captured image areas to provide a smooth and substantially seamless multimedia presentation. The multimedia control system 16(1) may also obtain and combine other multimedia content to generate the multimedia presentation, although other numbers and types of functions can be performed on the multimedia presentation.

Meanwhile, a target detection system 36 also optionally monitors the position of a subject S, such as a person, relative to the plurality of imaging systems 32(1)-32(5) and the walls 38(1)-38(5) of the display environment. The multimedia control system 16(2) dynamically can adjusts the multimedia presentation based on the relative position of the subject S determined by the target detection system 36.

Additionally, prior to the display of the multimedia presentation, disposable display panels with a non-permanent adhesive are detachably secured to the walls 38(1)-38(5) in the display environment in a two-dimensional, user configurable pattern, although other types and numbers of panels in other configurations could be used. The detection systems 34(1)-34(5) can identify the identity and configuration of the display panels and provide this determination to the multimedia control system 16(2) for use in controlling the output of the multimedia presentation from the imaging systems 38(1)-38(5). Once the walls 38(1)-38(5) or other area for the display environment is set, the multimedia control system 16(2) controls the imaging systems 32(1)-32(5) to output the adjusted multimedia presentation onto the display panels on the walls 38(1)-38(5) of the display environment.

The operation of the multimedia presentation system 50 in accordance with embodiments of the present invention will now be described with reference to FIG. 3. The multimedia presentation system 50 is engaged and the positioning of the imaging systems 52(1)-52(5) can be adjusted. This adjustment can be manual by the user or automatically by the multimedia control system 16(3).

Once the imaging controls and positioning is set, the detection systems 54(1)-54(5) determine an orientation and distance from each of the imaging systems 52(1)-52(5) to the inner surface 42 of projection structure 40. Next, the multimedia control system 16(3) controls the imaging systems 52(1)-52(5) to adjust the output of the captured image areas for the multimedia presentation on to different seventy-degree arcs of the inner surface 42 of projection structure 40 based on the determined relative position of each of the plurality of imaging systems with respect to the walls 38(1)-38(5) of the display environment on which the image areas are displayed. Since the projection structure 40 is made of a translucent material, the multimedia presentation is viewable on the outer surface 44 of the projections structure, however other configurations could be used. For example, the imaging systems 52(1)-52(5) could output for display video of a three-dimensional scene on to an inner surface 42 of display structure 40 for viewing on the inner surface of display structure 40 if the display structure were opaque, such as in a planetarium setting. In another example, the imaging systems 52(1)-52(5) along with the detection systems 54(1)-54(5) and the multimedia control system 16(3) could be positioned outside of and around the outer perimeter of the projection structure 40 to output for display video of a three-dimensional scene on to the outer surface 44 of display structure 40 for viewing on the inner surface 42 of the display structure 40.

Accordingly, as illustrated and described herein the present invention provides a multimedia capture, editing, and/or presentation system that can capture, edit, and/or present information from multiple angles of a scene simultaneously in a very wide view giving an audience a realistic and immersive experience. The present invention captures the wide area content with relative positioning information of each of the image capturing system with respect to the captured content to accurately produce wide-area multimedia content. Additionally, the present invention determines the relative position of multiple projection systems to a display environment to adjust the output of the displayed, wide-area, multimedia content. The present invention is able to dynamically adjust the output of the wide-area, multimedia content as the display environment changes and/or as a subject moves. Further, with the present invention there is no imposed aspect-ratio and the captured content can be accurately displayed on a variety of different types of display settings and configurations, such desktops, floors, arbitrary wall spaces, and even people as part of the display.

Having thus described the basic concept of the invention, it will be rather apparent to those skilled in the art that the foregoing detailed disclosure is intended to be presented by way of example only, and is not limiting. The drawings set forth herein are for exemplary purposes and are not to scale. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Further, other combinations of the systems described and illustrated herein, such as the systems for capture, editing, presentation, and display, can be used. Accordingly, the invention is limited only by the following claims and equivalents thereto.

What is claimed is:

1. A multimedia capture system comprising:
a plurality of imaging systems, each imaging system having an image sensor that receives image data sufficient to capture portions of a scene from at least partially different locations; and
one or more detection systems, each detection system having a detection sensor that receives positioning data sufficient to determine a relative position of each of the plurality of imaging systems with respect to the different locations of the scene from where the image data is captured, wherein the relative position of each of the plurality of imaging systems and the captured scene portions are used to generate a multimedia presentation of the scene and wherein the determination of a relative position of each of the plurality of imaging systems is provided by the one or more detection systems wherein the detection sensor of at least one of the one or more detection systems is not an image sensor of the particular imaging system itself.

2. The system as set forth in claim 1 further comprising a control system that generates the multimedia presentation based on the relative position of each of the plurality of imaging systems and the captured scene portions.

3. The system as set forth in claim 2 wherein the control system edits the captured image data from the plurality of imaging systems to account for overlap between the captured scene portions.

4. The system as set forth in claim 2 wherein the control system combines the captured scene portions with one or more other types of multimedia to generate the multimedia presentation.

5. The system as set forth in claim 1 wherein the plurality of imaging systems capture the portions of the scene from the at least partially different locations from a view that exceeds at least ninety degrees in one or more dimensions.

6. The system as set forth in claim 1 further comprising a centralized support system, the plurality of imaging systems are positioned on the centralized support system to capture the portions of the scene.

7. The system as set forth in claim 6 wherein the support system comprises at least one of wearable gear and a mobile device.

8. A method for capturing a scene to generate a presentation, the method comprising:
capturing portions of a scene from at least partially different locations with an image sensor of an imaging system of a plurality of imaging systems; and
determining a relative position of each of the plurality of imaging systems from one or more detection systems, each detection system having a detection sensor that receives positioning data, wherein the positioning data captured by at least one of the one or more detection systems is not provided by an image sensor of the particular imaging system itself with respect to the different locations of the scene from where the image areas are captured, wherein the relative position of each of the plurality of imaging systems and the captured scene portions are used to generate a multimedia presentation of the scene.

9. The method as set forth in claim 8 further comprising generating the multimedia presentation based on the relative position of each of the plurality of imaging systems and the captured scene portions.

10. The method as set forth in claim 9 wherein the generating further comprises editing the captured scene portions from the plurality of imaging systems to account for overlap between the captured scene portions.

11. The method as set forth in claim 9 wherein the generating further comprises combining the captured scene portions with one or more other types of multimedia to generate the multimedia presentation.

12. The method as set forth in claim 8 wherein the capturing further comprises capturing the portions of the scene from the at least partially different locations from a view that exceeds at least 90 degrees in one or more dimensions.

13. The method as set forth in claim 8 further comprising positioning the plurality of imaging systems on a centralized support system to capture the scene portions.

14. The method as set forth in claim 13 wherein the support system comprises at least one of wearable gear and a mobile device.

* * * * *